United States Patent
Tutaj et al.

(10) Patent No.: US 9,365,285 B2
(45) Date of Patent: Jun. 14, 2016

(54) PROPELLER BLADE WITH REINFORCING SPARS AND BOXES, AND PROPELLER COMPRISING AT LEAST ONE SUCH BLADE

(71) Applicant: RATIER FIGEAC, Figeac (FR)

(72) Inventors: Stanislas Tutaj, Faycelles (FR); Bruno Petellaz, Beduer (FR)

(73) Assignee: RATIER FIGEAC, Figeac (FR)

( * ) Notice: Subject to any disclaimer, the term of this patent is extended or adjusted under 35 U.S.C. 154(b) by 745 days.

(21) Appl. No.: 13/721,727

(22) Filed: Dec. 20, 2012

(65) Prior Publication Data

US 2013/0164142 A1    Jun. 27, 2013

(30) Foreign Application Priority Data

Dec. 23, 2011    (FR) .................................... 11 04086

(51) Int. Cl.
| | |
|---|---|
| *F01D 5/14* | (2006.01) |
| *B64C 11/26* | (2006.01) |
| *B64C 11/24* | (2006.01) |
| *B29C 70/86* | (2006.01) |
| *B29L 31/08* | (2006.01) |

(52) U.S. Cl.
CPC ................ *B64C 11/26* (2013.01); *B29C 70/86* (2013.01); *B64C 11/24* (2013.01); *F01D 5/147* (2013.01); *B29L 2031/08* (2013.01)

(58) Field of Classification Search
CPC ......... F01D 5/147; F01D 5/30; F01D 5/3053; B29C 70/86; B64C 11/24; B64C 11/26
USPC ........................................................ 416/226
See application file for complete search history.

(56) References Cited

U.S. PATENT DOCUMENTS

| | | | |
|---|---|---|---|
| 3,586,460 A | | 6/1971 | Toner |
| 3,694,104 A | | 9/1972 | Erwin |
| 4,305,699 A | * | 12/1981 | Martinelli ............. B64C 27/473 416/226 |
| 4,626,172 A | * | 12/1986 | Mouille ............. B29D 99/0025 416/134 A |
| 4,833,911 A | * | 5/1989 | Zeeban ................... G01L 5/133 73/112.04 |
| 4,966,527 A | * | 10/1990 | Merz ..................... B29C 70/202 416/230 |
| 5,129,787 A | | 7/1992 | Violette et al. |
| 5,534,354 A | * | 7/1996 | Gregg .................. B21D 26/055 244/123.3 |

(Continued)

FOREIGN PATENT DOCUMENTS

| | | |
|---|---|---|
| DE | 12 59 560 | 1/1968 |
| GB | 871 625 | 6/1961 |
| GB | 2 168 111 | 6/1986 |

OTHER PUBLICATIONS

French Search Report dated Oct. 8, 2012, corresponding to the Foreign Priority Application No. 762912.

*Primary Examiner* — Dwayne J White
*Assistant Examiner* — Julian Getachew
(74) *Attorney, Agent, or Firm* — Young & Thompson

(57) ABSTRACT

The invention relates to a propeller blade which comprises a hollow casing (1) forming an extrados (5) and an intrados (4) which extend from a blade shank to a free end in the direction of the span, and a framework which is arranged in the hollow casing (1) and comprises a box spar (8), having a plurality of soles (9*a*, 9*b*, 10*a*, 10*b*) in surface contact with the hollow casing (1) so as to provide structural support for the hollow casing (1), and at least two cavities (15, 16) which are spaced apart in the direction of the chord (25), wherein the propeller blade further comprises at least two reinforcing spars (6, 7) which extend between the framework and the hollow casing.

17 Claims, 3 Drawing Sheets

(56) References Cited

Figure 4:
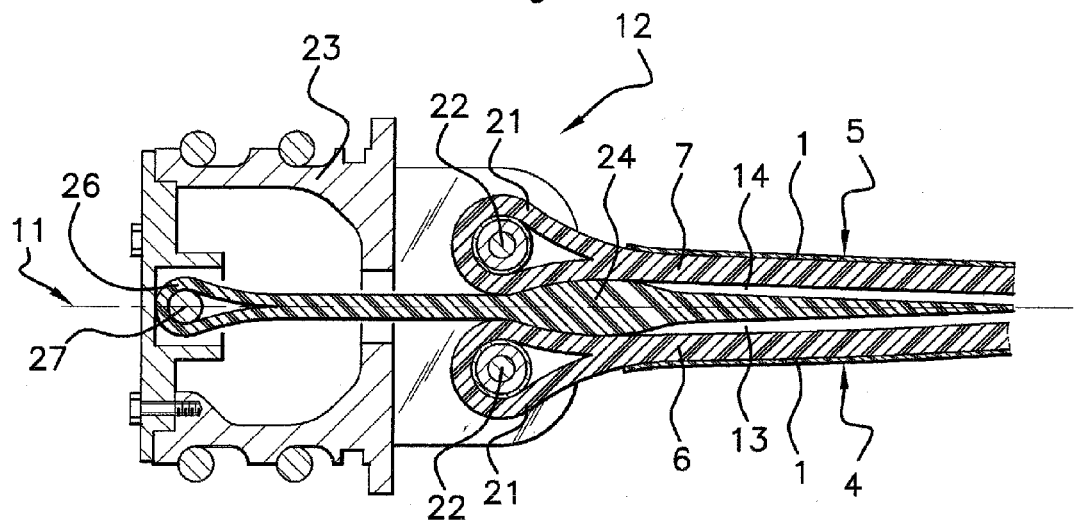

U.S. PATENT DOCUMENTS 6,431,837 B1 * 8/2002 Velicki ............... F01D 5/282
  416/223 R
7,600,978 B2 * 10/2009 Vance ............... F01D 5/147
  416/230

* cited by examiner

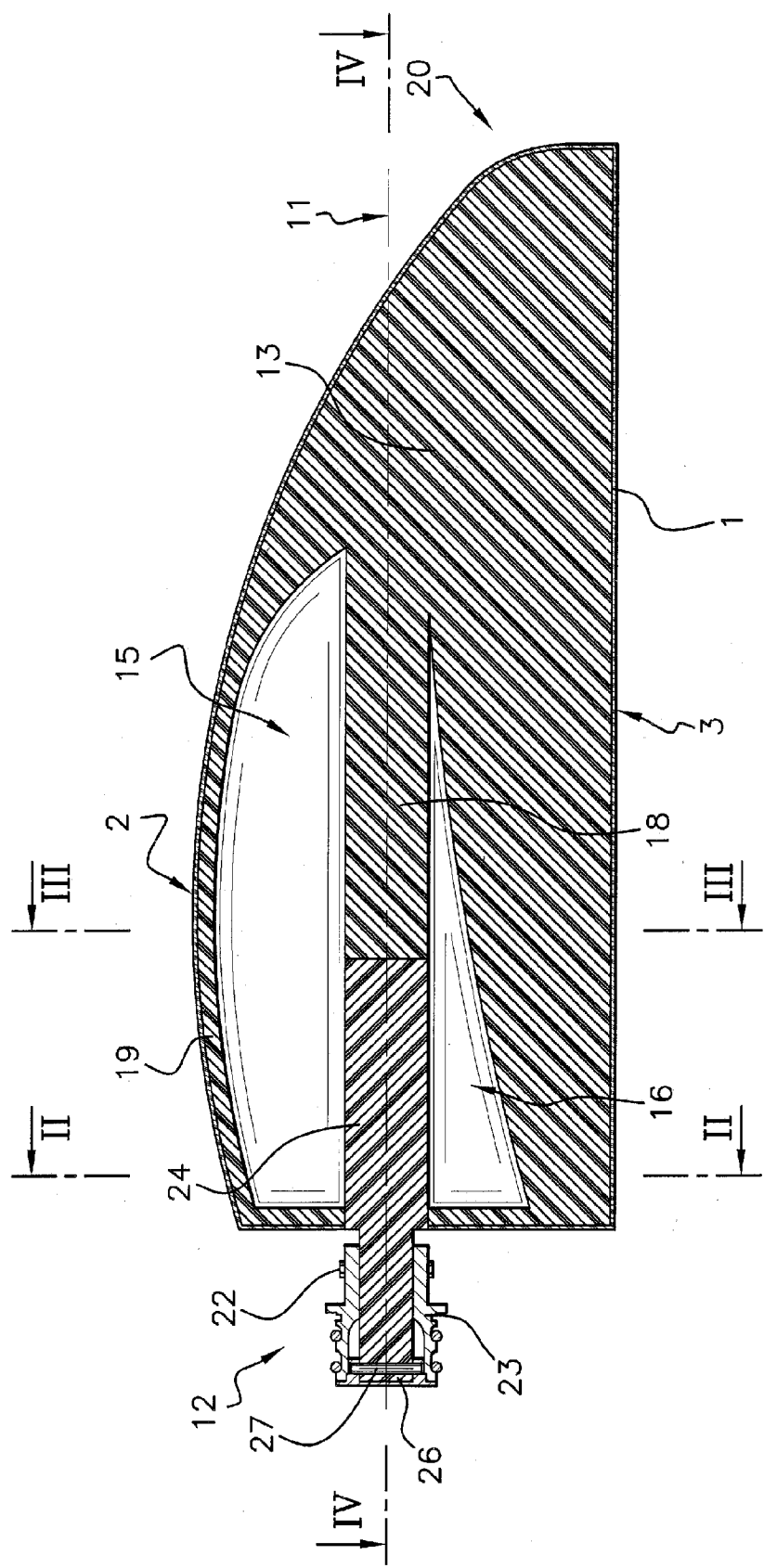

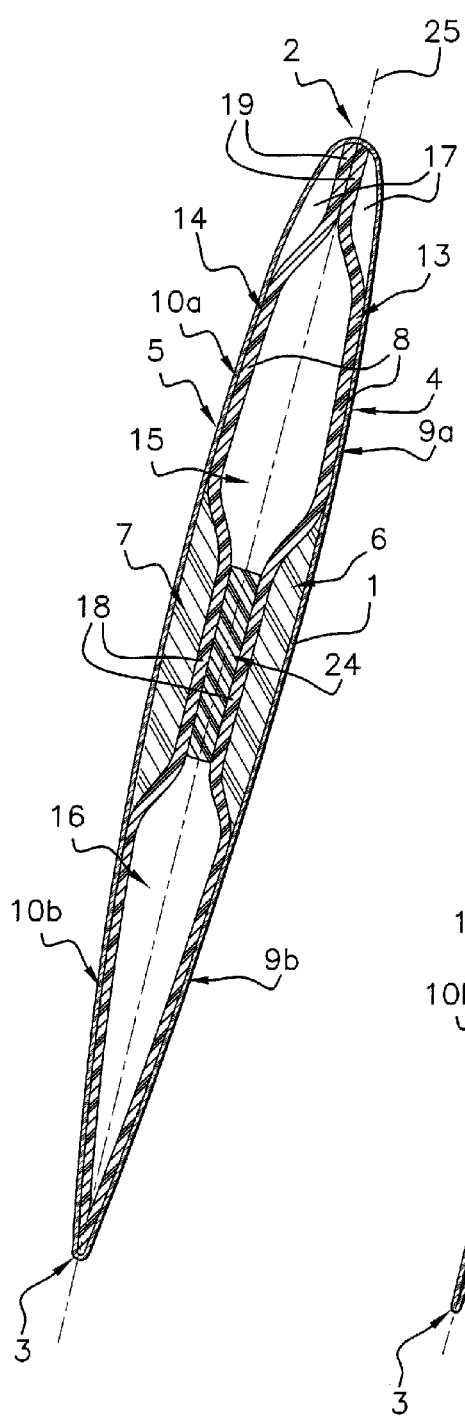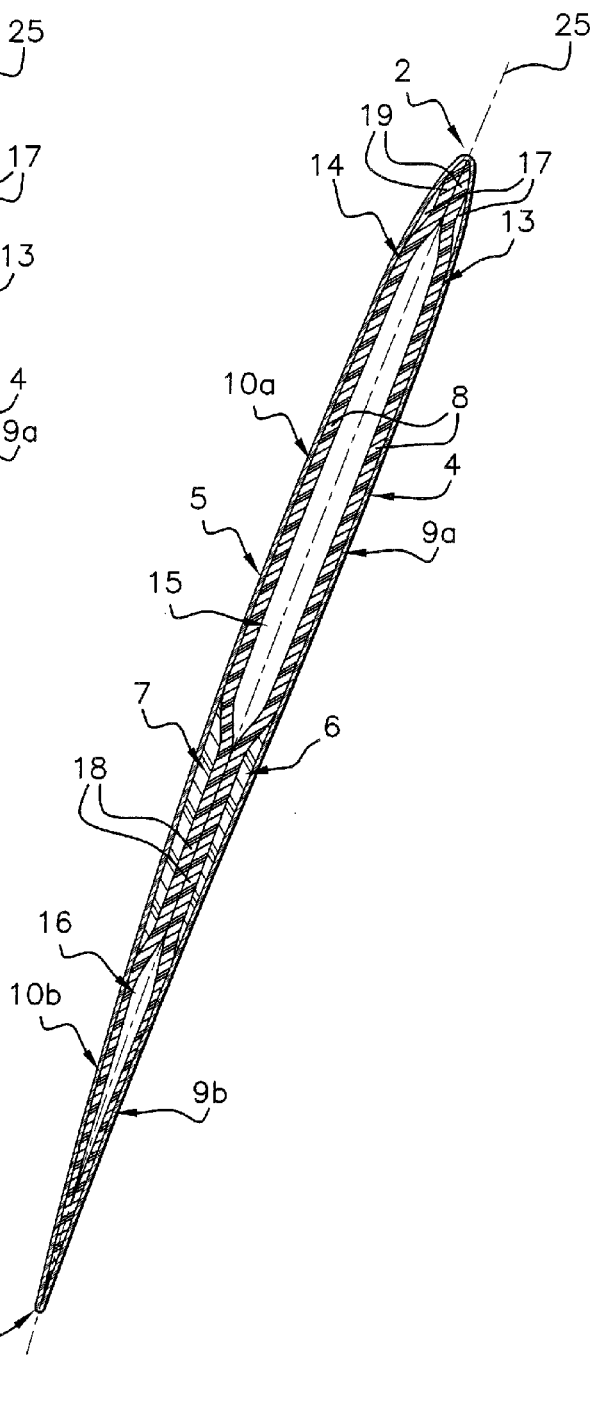

PROPELLER BLADE WITH REINFORCING SPARS AND BOXES, AND PROPELLER COMPRISING AT LEAST ONE SUCH BLADE

The invention relates to a propeller blade, especially a propeller blade for propelling and/or lifting an aircraft. The invention relates also to a propeller, especially a propeller of a turboprop engine of an aircraft, comprising at least one blade according to the invention, and to a turboprop engine and an aircraft.

In many fields, and in particular in the aeronautical field, the improvement in the efficiency of aircraft requires the aircraft to be ever more lightweight. For that reason, many solutions of hollow blades have already been proposed.

However, such blades are often fragile and do not have sufficient static mechanical strength and dynamic mechanical strength to carry out their propelling and/or lifting functions under extreme operating conditions (rapid rotation, high acceleration, strong vibrations, large temperature differences, frost, etc.). It is therefore important to be able to produce blades which are lightweight and resistant to any type of force and stress, and which especially can be mounted on propellers of very powerful aircraft turboprop engines.

There is known U.S. Pat. No. 5,129,787, which describes a hollow blade in which a spar forming internal boxes comes into contact with an aerodynamic outer skin in order to provide structural support by way of contact soles between the spar and the outer skin. Such a structure of a spar forming boxes allows the rigidity of a hollow blade to be improved. However, such a blade remains too fragile in certain applications, especially in the case of high angular acceleration. Such blades especially have little resistance to dynamic stresses, in particular to bending.

An object of the invention is, therefore, to remedy those disadvantages by proposing a propeller blade that is more resistant to the dynamic stresses to which it may be subjected.

The invention relates in particular to a blade whose bending strength is increased considerably.

The invention relates to a propeller blade that is lightweight.

The invention relates further to a propeller blade that is relatively simple and inexpensive to manufacture.

It is also an object of the invention to propose a propeller blade that is easy to mount on a hub.

Throughout the text, "extrados" denotes in the conventional manner one of the two main faces of a blade adapted to create aspiration of the blade by the air flowing along the extrados, from the leading edge to the trailing edge of the blade. Likewise, "intrados" denotes the main face opposite the extrados, which is adapted to create a thrust of the blade by the air flowing along the intrados, from the leading edge to the trailing edge of the blade.

Furthermore, throughout the text blade "shank" denotes an end of the blade situated on the side at which the blade is attached to a hub, and "free end" denotes the end of the blade situated opposite the blade shank.

Throughout the text, "chord" denotes a direction passing through the leading edge and the trailing edge of the blade. Likewise, "longitudinal" denotes a direction substantially parallel to a straight line connecting the blade shank to the free end of the blade. The "span" of the blade represents the maximum distance between the blade shank and the free end of the blade. In addition, "thickness" denotes the minimum distance at any point between the extrados and the intrados.

Throughout the text, the front and rear are defined relative to the leading edge and the trailing edge of the blade: an element located at the front is on the leading edge side, and an element at the rear is situated on the trailing edge side.

Accordingly, the invention relates to a propeller blade comprising:
- a hollow casing which has an outer surface forming an extrados and an intrados, each of which extends from a leading edge to a trailing edge in the direction of the chord of the blade, and from a blade shank to a free blade end in the direction of the span of the blade,
- a framework which is arranged in the hollow casing and comprises at least one spar, called the box spar, having:
  - a plurality of soles in surface contact with the hollow casing so as to provide structural support for the hollow casing,
  - at least two cavities spaced apart in the direction of the chord, wherein the propeller blade further comprises at least two reinforcing spars which extend between said box spar and the hollow casing.

A large part of the hollow casing (which is sometimes also called the skin) has an aerodynamic surface capable of exerting forces on air. The hollow casing is a casing which provides an aerodynamic function and a structural function.

For that reason, the framework provides structural support for the hollow casing by way of soles that are in surface contact with the inner surface of the hollow casing. Accordingly, the framework supports the outer shape of the hollow casing, therefore of the extrados and the intrados at least, and therefore maintains, especially maintains over time, the aerodynamic performance of the blade. The framework also advantageously maintains over time the shape of the leading edge and of the trailing edge.

The framework is advantageously attached to the hollow casing at least in the region of said soles, for example by copolymerization, adhesive bonding, joining, heat fusing, thermoforming, etc.

A framework according to the invention extends in at least part of the hollow casing and can have a single element, especially a box spar, or a plurality of elements assembled to one another.

A framework according to the invention advantageously has two or three cavities inside said framework. There is no reason why said framework should not form more than three longitudinal cavities. Said cavities extend longitudinally over at least half of the span and are spaced apart in the direction of the chord, so that at least one cavity, called the front cavity, is on the leading edge side, and at least one other cavity, called the rear cavity, is on the trailing edge side.

Each longitudinal cavity can be divided into a plurality of cavities which are spaced apart in the direction of the span, so that the framework forms a plurality of pockets which are limited in the direction of the chord and in the direction of the span.

In the case where the framework has three cavities, at least one is a front cavity situated in one half (in the direction of the chord) of the blade on the leading edge side, at least a second cavity is a rear cavity situated in another half (in the direction of the chord) of the blade on the trailing edge side, and the third cavity can be substantially central, that is to say arranged substantially along the median of the blade in the direction of the chord or along a straight line connecting the blade shank to the free end of the blade, or in the longitudinal axis of the blade shank. Such a central pocket can also be offset towards the front or towards the rear.

Such cavities advantageously form boxes which provide the blade with considerable structural strength for a relatively low weight compared with conventional solid blades. Indeed, such boxes generally contain one or more gases, especially air, or are filled with a lightweight material such as, for example, a filling foam or a honeycomb material.

By virtue of that longitudinal structure boxed in the direction of the chord at least, a box spar (and therefore a framework) according to the invention provides the blade with considerable torsional strength.

Advantageously and according to the invention, the framework comprises at least one box spar in the form of one or more web(s), the distance of which to the chord varies along the chord. Some portions of the box spar are in surface contact with the hollow casing by way of their soles, and other portions are at a distance from the hollow casing. The box spar forms longitudinal cavities which are on the inside thereof.

The framework forms partition(s) between different spaces of the hollow casing so that, in addition to the boxes delimited by the framework itself, interior spaces situated between the framework and the hollow casing can form additional cavities, for example between the front wall of a front box and the inside surface of the hollow casing on the leading edge side.

The inventors have found that, although the framework provides the blade substantially with structural support and torsional strength, it does not provide or provides little resistance to bending modes.

The reinforcing spars according to the invention improve the bending strength of a blade according to the invention. Such reinforcing spars improve the bending strength in both bending directions of the blade: from top to bottom in the thickness direction, and from front to rear in the direction of the chord.

Accordingly, the invention makes it possible to obtain, for the first time, a blade that is lightweight and has high resistance to bending modes and to torsional modes.

On the contrary, with equal bending strength, a blade according to the invention is lighter because it requires a less imposing framework: fewer structural elements constituting the framework, and/or framework elements of smaller cross-section.

The reinforcing spars are advantageously arranged between the framework and the casing, especially between the box spar and the hollow casing. Accordingly, the framework holds the reinforcing spars in position in the blade, and the reinforcing spars themselves provide structural support for the hollow casing.

The reinforcing spars are advantageously assembled (by copolymerization, adhesive bonding, heat fusing, thermoforming, joining, co-curing, etc.) to the framework and/or the hollow casing so as to avoid any relative movement between those different elements. In particular, the reinforcing spars generally being the blade structures that are attached to the hub, the joining thereof to at least one element chosen from the framework and the hollow casing is essential in order to ensure that the blade is retained relative to the hub.

The totality of the elements of the blade, especially the framework, the hollow casing and the reinforcing spars, are assembled to one another.

Advantageously, a blade according to the invention is prepared by a process in which:
- the framework is prepared, the cavities of said box spar being spaced apart in a direction, called the chord direction of the blade,
- the hollow casing is prepared,
- the hollow casing is arranged around the framework, at least part of the framework being in surface contact with the hollow casing,
- once the hollow casing has been arranged around the framework, a step of consolidation of the blade is carried out, at a predetermined temperature, so as to form a continuous bond between at least one polymer matrix of the hollow casing and at least one polymer matrix of the framework.

In addition, advantageously and according to the invention, the reinforcing spars are made of composite materials comprising at least a majority of fibers that are unidirectional in the direction of the span.

Since the composite materials have mechanical properties that are equivalent or superior to the other materials used in the aeronautical field, they permit considerable reductions in mass, which translate into improved performance, a reduction in fuel consumption and an increase in payload.

Arranging unidirectional fibers in the direction of the span enables the torsional strength of the reinforcing spars, and therefore of the blade, to be optimized.

The hollow casing and the framework are likewise advantageously made of composite material.

Advantageously and according to the invention, each of the parts of the blade is formed of composite material, the polymer matrix of which is of identical chemical nature.

Advantageously and according to the invention, the hollow casing, the framework (especially the box spar) and the reinforcing spars are attached mechanically to one another.

All techniques of attaching those elements may be envisaged. However, advantageously and according to the invention, the hollow casing, the framework and the reinforcing spars are prepared independently, are brought into contact with one another in their respective final positions and are then heat fused to one another by heat treatment so that polymerization of the polymer matrix (in the case of a thermosetting matrix) or fusion of the polymer matrices (in the case of a thermoplastic matrix) of the composite materials takes place at the interfaces between the hollow casing, the framework and the reinforcing spars.

Advantageously and according to the invention, a treatment, called pre-consolidation, permits attachment of the framework and the reinforcing spars previously put in position and in contact with one another.

Advantageously and according to the invention, the hollow casing is brought into surface contact with the upper soles and the lower soles of the box spar.

Accordingly, after having thus arranged the hollow casing in such a manner as to "close" the blade, it is possible to carry out a step of final consolidation of the blade. This comprises heat treatment under pressure, which is carried out, for example, in a closed vessel such as a furnace, an oven or an autoclave, for a predetermined period of time. The temperature, pressure and duration of such a heat treatment are determined especially as a function of the type of composite material(s) forming the blade and the size of the blade.

Advantageously and according to the invention, the composite material(s) forming the blade can include any polymer matrix having mechanical and physico-chemical properties which are suitable for the stresses to which a blade, especially a propeller blade, is likely to be subjected. Each polymer matrix of a composite material used in a blade according to the invention is chosen from thermosetting (or "thermoset") polymers and thermoplastic polymers. Advantageously and according to the invention, each of the parts of the blade is formed of a composite material, the polymer matrix of which is of identical chemical nature.

Advantageously and according to the invention, each polymer matrix is chosen from the group formed of epoxy resins, polyurethane resins, phenolic resins, polyester resins, vinyl ester resins, bismaleimide (BMI) resins and mixtures thereof.

Advantageously and according to the invention, each polymer matrix is chosen from the group formed of polyamides (PA), polyethylene terephthalates (PET) and polybutylene terephthalates (PBT), polycarbonates (PC), polyphenylene oxides (PPO), polybenzimidazoles (PBI), polyoxymethylenes (POM), polyether imides (PEI), polysulfones (PSU), polyphenylsulfones (PPSU), polyether sulfones (PES), polyether ether ketones (PEEK), polyphenyl sulfides (PPS), polyamide imides (PAI), polyimides (PI) and mixtures thereof.

Advantageously and according to the invention, each reinforcement in fiber form is chosen from carbon fibers, aramid fibers, carbon-aramid fibers, glass fibers, and natural fibers such as hemp or bamboo fibers.

Surprisingly, the combination of:
- reinforcing spars arranged not in the middle of the thickness of the blade but between the framework and the hollow casing,
- reinforcing spars made of composite materials with fibers that are predominantly unidirectional in the direction of the span,
- reinforcing spars attached to the framework and the hollow casing, makes it possible for the first time to obtain a blade that fulfils both the criterion of lightness and the criterion of resistance to high stresses, especially to high bending stresses.

Advantageously, in a blade according to the invention the length of the box spar and of each reinforcing spar depends:
- on the thickness of the blade,
- on the thickness of the hollow casing.

Moreover, advantageously and according to the invention, the lengths of the box spar and of each reinforcing spar depend on the respective thicknesses of each reinforcing spar and of the box spar.

Advantageously, in a blade according to the invention:
- the box spar extends longitudinally over at least half of the span of the blade,
- each reinforcing spar extends longitudinally over at least a third of the span of the blade, starting from the blade shank.

In particular, advantageously and according to the invention, the reinforcing spars extend longitudinally starting from the blade shank over at least a quarter of the span of the blade.

Accordingly, a blade according to the invention generally being thicker in its half situated on the blade shank side than in its half situated on its free end side, the reinforcing spars advantageously extend in that portion of the blade. The half of the blade that is situated on the blade shank side is in fact the portion of the blade that is subjected to the highest stresses, especially bending stresses, owing to the weight (and therefore the inertia) of the second blade half situated on its free end side.

The cross-section and in particular the thickness of a reinforcing spar can vary along its length arranged longitudinally according to the span of the blade. In particular, advantageously and according to the invention, the cross-section of each reinforcing spar diminishes gradually in the direction away from the blade shank.

In addition, advantageously and according to the invention, the reinforcing spars extend along a longitudinal axis in a continuation of the blade shank. Accordingly, when the blade is mounted in a hub, the reinforcing spars advantageously extend longitudinally in the axis of a radial shaft of the hub in which the blade is mounted.

Likewise, the box spar extends longitudinally starting from the blade shank over at least half of the span of the blade, especially over at least 80% of the span of the blade.

Advantageously and according to the invention, at least two reinforcing spars extend:
- in the direction of the chord between two cavities of the box spar,
- one facing the other in the thickness of the blade, a first one of said reinforcing spars extending along the extrados, a second one of said reinforcing spars extending along the intrados.

The reinforcing spars accordingly extend in a central part of the blade in the direction of the chord, especially when the framework has only one front cavity and one rear cavity.

The reinforcing spars accordingly form a central core of the blade, which is suitable for improving the bending strength of the blade. In addition, the reinforcing spars are in the continuation of fixings of the blade to a hub.

The reinforcing spars being arranged between the framework and the hollow casing on the one hand (in the direction of the thickness of the blade) and between two cavities on the other hand (in the direction of the chord), they thus allow the bending strength of the blade as a whole to be improved: their bending strength is transmitted to the blade as a whole by way of the framework.

Advantageously and according to the invention, said box spar has:
- at least two soles, called upper soles, which are in surface contact with the hollow casing on the extrados side,
- at least two soles, called lower soles, which are in surface contact with the hollow casing on the intrados side,
- at least one cavity, called the front cavity, which extends on the leading edge side, between a first upper sole, called the front upper sole, and a first lower sole, called the front lower sole, opposite said front upper sole,
- at least one cavity, called the rear cavity, which extends on the trailing edge side, between a second upper sole, called the rear upper sole, which is different from the front upper sole, and a second lower sole, called the rear lower sole, which is situated opposite said rear upper sole and is different from the front lower sole,
- at least one connection, called the central connection, which joins at least one sole chosen from the front upper sole and the front lower sole, and at least one sole chosen from the rear upper sole and the rear lower sole.

A box spar according to the invention advantageously has as many upper and lower soles as it has longitudinal cavities.

The central connection(s) extend(s) between a front cavity and a rear cavity and allow(s) the front and rear cavities to be maintained at a constant distance from one another.

Advantageously, the box spar has a first central connection on the extrados side between the front upper sole and the rear upper sole, and a second central connection—which is different from the first central connection—on the intrados side between the front lower sole and the rear lower sole.

The two central connections so formed can be assembled to one another or separated from one another in the thickness direction.

The central connection(s) therefore extend(s), in the thickness direction, between two reinforcing spars. A first reinforcing spar extends between the central connection of said box spar and the hollow casing on the extrados side, and a second reinforcing spar extends between the central connection of said box spar and the hollow casing on the intrados side.

In addition, advantageously and according to the invention, the box spar extends from a front zone situated close to the leading edge to a rear zone situated close to the trailing edge in the direction of the chord.

In particular, advantageously and according to the invention, the box spar extends from the leading edge to the trailing edge in the direction of the chord.

Movements of the box spar in the hollow casing along the chord (from front to rear) are accordingly prohibited. In addition, the box spar provides structural support for the hollow casing, and especially for the leading edge and the trailing edge, which is essential for the aerodynamics of the blade, which is subjected to high stresses.

To that end, the box spar can have a front and/or rear connection, respectively, in a continuation at the front of a front cavity and/or of a rear cavity, or alternatively can have a front cavity which extends in contact with the inside surface of the hollow casing to the leading edge (or a rear cavity to the trailing edge).

When the box spar has a connection to the front of a front cavity to the leading edge (or to the rear of a rear cavity to the trailing edge), one or more cavities extend between that connection and the inside surface of the hollow casing, which cavities can, for example, be filled with a lightweight filling foam, additional reinforcing spars, for example made of composite material, a honeycomb material, air, etc.

Advantageously and according to the invention, said box spar is formed of a first half-shell, called the upper half-shell, which has at least two upper soles and is arranged on the extrados side, and of a second half-shell, called the lower half-shell, which has at least two lower soles and is arranged on the intrados side, the two half-shells being assembled together at least at the front of a front cavity on the leading edge side and at the rear of a rear cavity on the trailing edge side.

Manufacture of the box spar is thus facilitated: it is sufficient to produce two half-shells, each in the form of an emhubed web, instead of a box spar having cavities and/or uneven areas. Accordingly, when the box spar is made of metal, it is sufficient, in order to produce the two half-shells, to draw two metal sheets to form the two half-shells; likewise, if the box spar is made of composite material, starting from pre-impregnated webs, it is sufficient to arrange the pre-impregnated webs on a mould of each half-shell.

The two half-shells are then attached to one another, for example by copolymerization, co-curing, adhesive bonding, heat fusing, thermoforming, joining, etc., and are then attached to the hollow casing at least in the region of the soles.

In addition, advantageously and according to the invention, said framework further comprises a central spar which extends longitudinally along at least one central connection and separates a front cavity from a rear cavity.

The central spar is advantageously made of a composite material comprising a majority of unidirectional fibers arranged in the direction of the span.

Accordingly, the central spar comprises an assembly of fibers which are advantageously oriented in the direction of the span.

Advantageously and according to the invention, the central spar extends between the two half-shells of the box spar.

In particular, the central spar extends between a central connection of the upper half-shell and a central connection of the lower half-shell.

Accordingly, in the central part of the blade, there is a core constituted in succession of: the hollow casing on the intrados side, a reinforcing spar on the intrados side, the lower half-shell, the central spar, the upper half-shell, a reinforcing spar on the extrados side, the hollow casing on the extrados side.

Advantageously, the central connections of the box spar being spaced apart in the thickness direction, the central spar is positioned in that space and thus isolates a front cavity from a rear cavity.

The central spar can be solid or hollow. If it is hollow, it may or may not be filled, for example with a filling foam. However, filling a hollow spar with a foam means that it is no longer possible to carry out non-destructive tests on the blade owing to the presence of a plurality of heterogeneous materials.

The central spar is advantageously made of composite material.

The central spar improves the structural strength of the blade and especially its resistance to bending stresses. In addition, by filling a space between the central connections of the two half-shells of the central spar, it improves the resistance of the blade to vibrations.

Such a central spar is optional: the central connections and/or the reinforcing spars can have a greater thickness, so that the central connections of each of the half-shells of the box spar are in contact with one another and thus isolate a front cavity from a rear cavity.

In addition, advantageously and according to the invention, each reinforcing spar extends into the blade shank, where it forms a root loop adapted to receive a fixing pin.

In particular, the reinforcing spars are advantageously mounted integral with an anchoring bush by way of said fixing pins, the anchoring bush itself being adapted to be able to be mounted in a radial shaft of a hub and anchored at least longitudinally in that radial shaft.

The reinforcing spars therefore also serve to fix the blade to an anchoring bush and therefore to a hub. The reinforcing spars of a blade serve to transmit the rotary movement imposed by a hub to said blade. For that reason, the reinforcing spars, the hollow casing and the framework are advantageously attached so as to form a single unit.

Advantageously, said anchoring bush is mounted in a rotary manner in the radial shaft around the longitudinal axis of the blade (that is to say around a radial axis of the hub) so that the pitch of the blade can be adjusted.

Advantageously, the hollow casing does not extend into the blade shank, but the reinforcing spars project from the hollow casing into the blade shank. It is in that portion of the blade shank that they each have a root loop.

Furthermore, advantageously and according to the invention, a first root loop of a first reinforcing spar extends into the blade shank at a minimum distance from the hollow casing that is strictly greater than the minimum distance at which a second root loop of a second reinforcing spar extends into the blade shank.

Arranging the two (or more) root loops at different distances from the base on the blade shank side of the hollow casing allows an increase in volume in the hub, in particular in the anchoring bush. The root loops and their fixing pin in fact have a large lateral space requirement relative to the volume available in an anchoring bush, so that arranging them offset relative to one another in the longitudinal direction allows the thickness of the blade shank to be reduced. A contrario, with equal blade thickness, this allows thicker reinforcing spars to be used and a stronger root thus to be formed.

The ratio of the bending strength of the blades to the space requirement of the blade shank in the thickness direction is therefore optimized. In particular, such an arrangement enables the stresses to which the fixing pins are subjected to be reduced, the thickness of the blade shank to be reduced and, therefore, the total mass of the blade to be reduced.

In particular, advantageously and according to the invention, said central spar extends into the blade shank beyond the root loops of the reinforcing spars, where it forms a safety loop adapted to receive a safety pin, said safety loop and said safety pin being mounted with a clearance.

Other structural elements, of the spars or the framework, can have blade root fixings in an anchoring bush. Accordingly, the central spar according to the invention advantageously has a root loop, called the safety loop, which is adapted to be held in an anchoring bush by a fixing pin, called the safety pin.

Advantageously, the safety loop of the central spar is mounted with a clearance relative to the safety pin which passes through it. Accordingly, during normal operation, the safety loop and the safety pin are not stressed, so that they are not subject to wear over time—in particular they are not subject to mechanical fatigue. The central spar accordingly provides safety retention of the blade in case of rupture of one or more of the fixings (root loops and fixing pins) of the reinforcing spars.

The root loops and fixing pins of the reinforcing spars are in fact themselves subject to high stresses and may therefore exhibit signs of fatigue, which can lead to rupture. Likewise, the anchoring bush of the blade can undergo sudden rupture. A rotating propeller blade whose retention means break is freed and becomes very dangerous to the aircraft and its occupants, on the one hand, and to people on the ground, on the other hand.

For that reason, advantageously and according to the invention, the safety loop of the central spar provides passive safety anchoring which is not subject to fatigue during normal operation.

The safety loop of the central spar is also arranged at the bottom of the anchoring bush so that, if the latter breaks in a portion between its bottom and the fixing pins of the reinforcing spars, the central spar provides safety retention of the blade in the hub.

A blade according to the invention is advantageously to be mounted on a propeller of a turboprop engine of an aircraft. Its lightness and its high strength—especially bending strength—are particularly valuable advantages in this respect. A blade according to the invention, being particularly resistant to bending, is able to undergo considerable acceleration, inducing a large pressure difference between the intrados and the extrados on the air.

For that reason, the invention extends also to a turboprop engine propeller comprising at least one blade according to the invention.

A blade according to the invention is advantageously used on an aircraft turboprop engine propeller, in multiple examples. Accordingly, a turboprop engine propeller according to the invention advantageously comprises at least two blades, especially advantageously between three and eight blades according to the invention. A propeller according to the invention also advantageously comprises a central hub which is driven by a motor, at least one anchoring bush for each blade in the hub, and generally a device for adjusting the pitch of the blades during flight.

In particular, a propeller according to the invention comprising a plurality of blades according to the invention can advantageously be mounted on an aircraft with particularly powerful turboprop engines, the blades being particularly resistant to stresses—especially bending stresses.

Furthermore, the invention extends also to a turboprop engine comprising at least one propeller according to the invention.

Such a turboprop engine (or more generally motive power unit) advantageously comprises one or two propellers according to the invention. When said turboprop engine comprises a plurality of propellers according to the invention, they may be, for example, contra-rotating.

The invention extends also to an aircraft comprising at least one turboprop engine according to the invention.

An aircraft comprising turboprop engines with propellers comprising blades according to the invention is particularly advantageous. It is, in fact, a potentially powerful aircraft, which is therefore able to transport heavy loads owing to powerful turboprop engines and lightweight propellers. Furthermore, despite the power of the turboprop engines and the lightness of the propellers, the aircraft is particularly safe by virtue of the reinforcing spars, which improve the bending strength of said blades.

The aircraft advantageously comprises two, four, six or eight turboprop engines, and can have more in order to develop even greater power, especially during take-off The invention relates also to a propeller blade, a turboprop engine propeller, a turboprop engine and an aircraft, characterized in combination by all or some of the features mentioned hereinabove or hereinbelow.

Other objects, features and advantages of the invention will become apparent upon reading the following description, which is not to be interpreted as limiting and makes reference to the accompanying figures, in which:

FIG. 1 is a diagrammatic representation of a propeller blade according to an embodiment according to the invention, in a top view of a longitudinal section through a surface comprising the chords of the blade, FIG. 2 is a view in transverse section according to plane II-II of a blade according to the invention according to the embodiment of FIG. 1, FIG. 3 is a view in transverse section according to plane III-III of a blade according to the invention according to the embodiment of FIGS. 1 and 2, FIG. 4 is a view in longitudinal section according to plane IV-IV of a blade shank according to the invention according to the embodiment of FIGS. 1, 2 and 3, FIG. 5 is a view in longitudinal section of a second embodiment of a blade shank according to the invention.

The propeller blade according to the invention shown in FIGS. 1 to 4 is a blade of a propeller of a turboprop engine of an aeroplane.

The blade is not flat, therefore in FIG. 1 it is shown in a top view (from the extrados) in a section through a complex surface comprising the totality of the chords of the blade. Some internal elements of the blade are thus visible.

The blade has a hollow casing 1 which has an aerodynamic surface forming an extrados 5 and an intrados 4, each of which extends from a leading edge 2 to a trailing edge 3 in the direction of the chord, and from a blade shank 12 to a free end 20 of the blade in the direction of the span. The chord 25 of the blade is, at any point along the span, a straight line passing through the leading edge 2 and the trailing edge 3 and orthogonal to a longitudinal axis 11. The longitudinal axis 11 is a longitudinal axis of the blade, in the continuation of the blade shank. When the blade is mounted in a radial shaft of a propeller hub, the longitudinal axis 11 corresponds at least substantially to a radial axis of the hub.

In FIGS. 2 and 3, the internal structure of the blade is shown:

by a first section II-II through a transverse plane shown in FIG. 1, at a sixth of the span of the blade starting from the blade shank 12, by a second section III-III through a transverse plane shown in FIG. 1, at a third of the span of the blade starting from the blade shank 12.

In the hollow casing, a framework comprising a box spar 8 and a central spar 24 supports the shape of said hollow casing by way especially of lower soles 9a, 9b on the intrados side and upper soles 10a, 10b on the extrados side. Said soles 9a, 9b, 10a, 10b are in contact with the inside surface of the hollow casing.

The box spar 8 supports the leading edge 2 by way of two connections 19 which extend at the front of the box spar to the inside surface of the hollow casing. The box spar 8 supports the trailing edge 3 by virtue of the extension of the rear soles 9b, 10b to the trailing edge.

The box spar 8 provides structural support for the hollow casing and imparts torsional strength to the hollow casing and therefore to the blade.

The box spar 8 extends over 90% of the span of the blade, starting from the blade shank, and does not extend into the blade shank.

The box spar 8 is advantageously formed of two half-shells 13, 14. A first half-shell, called the lower half-shell 13, on the intrados 4 side has a front connection 19 in contact with the leading edge, a front lower sole 9a, a central connection 18, a rear lower sole 9b, which extends in contact with the inside surface of the hollow casing 1 to the trailing edge 3.

A second half-shell, called the upper half-shell 14, on the extrados 5 side has a front connection 19 in contact with the leading edge, a front upper sole 10a, a central connection 18, a rear upper sole 10b, which extends in contact with the inside surface of the hollow casing 1 to the trailing edge 3.

Between the two front soles 9a, 10a of the box spar there extends a front cavity 15 inside the box spar. The front cavity 15 extends longitudinally over approximately 80% of the span of the blade.

Likewise, between the two rear soles 9b, 10b of the box spar there extends a rear cavity 16 inside the box spar. The rear cavity 16 extends longitudinally over approximately 60% of the span of the blade.

In the embodiment shown, the front cavity 15 and the rear cavity 16 are left empty, that is to say are filled with air, in order to propose a very lightweight blade.

Furthermore, there remain two forward cavities 17 close to the leading edge 2, between the hollow casing and the front connections 19 of the box spar with the hollow casing. Those forward cavities 17 are advantageously filled with a lightweight and strengthening filling foam in order to improve the impact resistance of the leading edge.

Between the central connections 18 of each of the two half-shells 13, 14 of the box spar 8 there extends a central spar 24 which isolates the front cavity 15 from the rear cavity 16 completely.

The central spar 24 is a spar which contributes to the general bending strength of the blade. The thickness of the central spar diminishes in the direction away from the blade shank, so that the central spar extends over a little less than one third of the span of the blade, starting from the blade shank, because it is then thinner and the central connections 18 of the two half-shells 13, 14 are assembled to one another. For that reason, the central spar 24 is visible in FIG. 2 but not in FIG. 3.

Moreover, between the central connection 18 of the lower half-shell 13 and the hollow casing there extends a lower reinforcing spar 6. Likewise, between the central connection 18 of the upper half-shell 14 and the hollow casing there extends an upper reinforcing spar 7.

The totality of the reinforcing spars 6, 7, the central connections 18 of the box spar and the central spar 24 forms the core of the blade, which extends generally longitudinally along the longitudinal axis 11, in the axis of the blade shank, and therefore of a radial hub shaft in which the blade is to be fixed.

The two reinforcing spars 6, 7 are in surface contact with the central connections 18 and the hollow casing. They extend longitudinally over approximately half the span of the blade and provide increased bending strength around axes orthogonal to the longitudinal axis 11. Their thickness also diminishes along the longitudinal axis 11 in the direction away from the blade shank, especially in their portion closest to the free end 20 of the blade. Accordingly, the reinforcing spars 6, 7 have a smaller thickness in FIG. 3 as compared with FIG. 2.

The reinforcing spars 6, 7, the box spar 8 and the central spar 24 are all attached to one another and are attached to the hollow casing 1 by way of the soles 9a, 9b, 10a, 10b and the contact between reinforcing spars 6, 7 and hollow casing 1. The blade thus forms a single unit mechanically, without elements that are movable relative to one another.

In particular, each of those elements was prepared in its final form independently of the other parts, with optional partial polymerization of their polymer matrix (especially in the case of a thermosetting matrix). They were then arranged relative to one another in their final position, the hollow casing especially being in contact with the reinforcing spars and with the box spar in the region of the soles and the front connections 19, and the box spar further being in contact with the reinforcing spars and with the central spar. Then, a final heat treatment was applied to the blade so that polymerization of the polymer matrix of each part was completed, creating polymer bonds in the region of the areas of contact between the parts, so that said parts ultimately form a single unit.

The reinforcing spars 6, 7 significantly improve the bending strength of a blade according to the invention.

The hollow casing, the reinforcing spars 6, 7, the box spar 8 and the central spar 24 are all made of composite material in order to provide a particularly lightweight blade. In particular, the reinforcing spars 6, 7 and the central spar 24 are made of composite material in which a large majority of the fibers are unidirectional according to the longitudinal axis 11, that is to say according to the span of the blade, so as to improve their bending strength.

The reinforcing spars are advantageously a matrix of carbon fibers arranged longitudinally, in an epoxy resin.

The reinforcing spars 6, 7 extend into the blade shank 12, where they form root loops 21 adapted to fix the blade in an anchoring bush 23.

Figure 5:
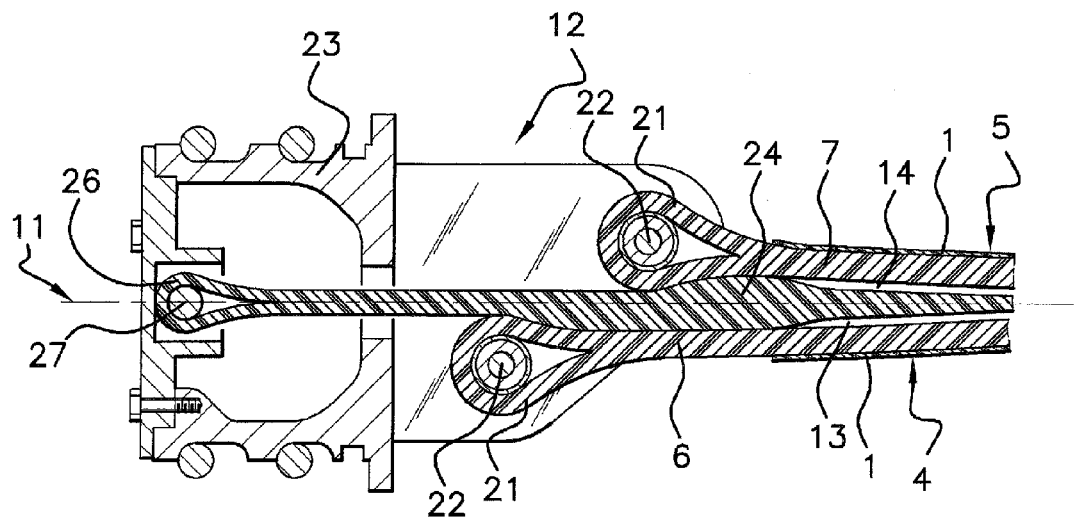

As shown in FIGS. 4 and 5, the root loops 21 coil around fixing pins 22 mounted integral with the anchoring bush 23. The fixing pins 22 of the reinforcing spars 6, 7 are advantageously bolts which pass through the root loops 21 and the anchoring bush 23 from one side to the other.

Likewise, the central spar 24 has a safety loop 26, through which there passes a safety pin 27 which is mounted by its two ends in housings of the anchoring bush 23. The safety loop 26 and the corresponding safety pin 27 are mounted close to the bottom of the anchoring bush so as to be able to retain the blade in case of rupture of the fixing means (root loops, fixing pins) or of the anchoring bush in a zone between the safety pin 27 and the fixing bolts 22.

Furthermore, the safety loop 26 and the safety pin 27 are mounted with a clearance between them so that no force is transmitted between the safety loop 26 and the safety pin 27 during normal operation in order to avoid any wear or fatigue during normal operation. The clearance between those two parts can be filled with a soft material that absorbs the relative vibrations of the central spar and of the anchoring bush.

The predominantly unidirectional fibers of the spars 6, 7, 24 coil to form the root and safety loops, so as to provide maximum strength, especially longitudinal tensile strength (corresponding to a centrifugal force when the blade is mounted in a radial shaft of a hub driving the blade(s) in rotation).

The anchoring bush is adapted to anchor the blade by its shank in a radial hub shaft. It advantageously has peripheral bearings which are adapted to abut circular shoulders of a radial hub shaft, so as to be able to adjust the pitch of the blade, the latter being wholly integral with the anchoring bush.

In the first embodiment of a blade shank 12 according to the invention, the root loops 21 of the two reinforcing spars 6, 7 are at equal distances from the base of the hollow casing 1.

In the second embodiment of a blade shank 12 according to the invention, the root loops 21 of the two reinforcing spars 6, 7 are at different distances from the base of the hollow casing 1. This allows a space requirement of the blade shank to be obtained that is reduced in the thickness direction, while reducing the stresses to which the pins are subjected.

The invention can be the subject of many other variant embodiments which are not shown.

The invention can in particular advantageously be used in propeller blades that are not intended for aircraft, such as, for example, blades for wind-power engines, turbine blades, marine and submarine propeller blades, blades for terrestrial vehicles (for example hovercraft blades), etc. The invention extends further to types of motive power unit other than turboprop engines: for example turbofans with open rotors, with rotors with contra-rotating propellers, etc.

There is no reason why the hollow casing should not also have means for fixing in the anchoring bush. Likewise, there is no reason why another element that is not part of either the membrane or the hollow casing but is connected to one of those two structures at least should not have means of fixing to the anchoring bush.

There is no reason why each of the elements of the blade should not be made of a material other than a composite material. Accordingly, the hollow casing, for example, which must withstand impacts with external objects, may be made of a metal or of a metal alloy.

Moreover, according to the invention a plurality of longitudinal boxes may be produced, especially more than two boxes. Likewise, a plurality of longitudinal spars, even or odd in number, may be produced, especially more than two longitudinal spars, which are then not necessarily centred around the longitudinal axis 11.

A larger or smaller number of cavities may be produced in a blade according to the invention, and each cavity may be filled with a material adapted to be able to provide longitudinal balancing. In particular, a different number of front or rear longitudinal boxes may be envisaged according to the invention.

Each cavity may advantageously be left empty (filled with air) or be filled with a lightweight material of the honeycomb material type, such as a non-structural polymer foam, or may even be filled with a fiber-reinforced structural material.

Furthermore, the connections 19 are not necessarily contiguous with the leading edge, so that a single forward cavity 17 is formed close to the leading edge.

In addition, the framework of a blade according to the invention does not necessarily comprise a single box spar. Accordingly, a plurality of half-shells which are spaced apart along the span of the blade may be envisaged, the reinforcing spars providing the bending strength of the blade. Likewise, the framework may be formed of a plurality of fine elements assembled to form a mesh, without having to form the mutually sealed front and rear boxes.

Furthermore, the blade may be fixed in an anchoring bush or in a radial hub shaft by numerous means other than root loops and fixing pins: for example, by screwing—the blade shank having a thread that cooperates with an internal thread of the anchoring bush (or of a radial hub shaft), by joining—the blade having a profile of the dovetailed, tapered type, etc., and the anchoring bush or the radial shaft having a cooperating housing, or the like.

In addition, it is possible to add metal protecting elements, for example made of nickel or nickel-based alloy, (not shown) in the region of the leading edge of a blade according to the invention so as to protect the leading edge and locally enhance the impact resistance.

The invention claimed is:

1. A propeller blade comprising:
    a hollow casing having an outer surface forming an extrados and an intrados, each of the extrados and the intrados extending from a leading edge to a trailing edge in a chord-wise direction of the blade, and from a blade shank to a free end of the blade in a span-wise direction of the blade;
    a framework arranged in the hollow casing and comprising at least one spar, called the box spar, having:
        a plurality of soles in surface contact with the hollow casing and providing structural support for the hollow casing,
        said plurality of soles forming at least two cavities spaced apart from each other in the chord-wise direction by additional cavities extending longitudinally between each side of the box spar and the hollow casing,
    wherein the propeller blade further comprises at least two reinforcing spars extending in the span-wise direction in said additional cavities between said box spar and the hollow casing, each of said reinforcing spars extending into the blade shank and forming a root loop in the blade shank, the root loop being adapted to receive a fixing pin.

2. The blade as claimed in claim 1, wherein the reinforcing spars are solid.

3. The blade as claimed in claim 1, wherein, of the box spar and the reinforcing spars, only the reinforcing spars extend into the blade shank.

4. The blade as claimed in claim 1, wherein:
    said box spar comprises at least one connection, called the central connection, which joins at least two of said plurality of soles that are successive in the chord-wise direction,
    a distance between the central connection of the box spar and the hollow casing is non-zero, and
    each of said reinforcing spars extends, in a thickness direction of the blade, between the central connection of the box spar and the hollow casing.

5. The blade as claimed in claim 1, wherein said box spar has:
    at least two of said plurality of soles, called upper soles, which are in surface contact with the hollow casing on an extrados side,
    at least two of said plurality of soles, called lower soles, which are in surface contact with the hollow casing on an intrados side,
    at least one cavity, called the front cavity, which extends on a leading edge side, between a first of said upper soles, called the front upper sole, and a first of said lower soles, called the front lower sole, opposite said front upper sole, at least one cavity, called the rear cavity, which extends on a trailing edge side, between a second of said upper soles, called the rear upper sole, which is different from the front upper sole, and a second of said lower soles, called the rear lower sole, which is situated opposite said rear upper sole and is different from the front lower sole.

6. The blade as claimed in claim 1, wherein the box spar extends, in the hollow casing, from a front zone situated along the leading edge to a rear zone situated along the trailing edge in the chord-wise direction.

7. The blade as claimed in claim 1, wherein said box spar is formed of a first half-shell, called the upper half-shell, which has at least two upper ones of said plurality of soles and is arranged on an extrados side, and of a second half-shell, called the lower half-shell, which has at least two lower ones of said plurality of soles and is arranged on an intrados side, the two half-shells being joined together in front of a front cavity on a leading edge side and at a rear of a rear cavity on a trailing edge side.

8. The blade as claimed in claim 7, wherein said framework further comprises a central spar which extends longitudinally along a neutral axis of the blade.

9. The blade as claimed in claim 8, wherein the central spar extends between the two half-shells of the box spar, in contact with the two half-shells of the box spar, between two of said reinforcing spars.

10. The blade as claimed in claim 9, wherein said central spar extends into the blade shank beyond the root loops of the reinforcing spars, said central spar forming in the blade shank a safety loop adapted to receive a safety pin.

11. A turboprop engine propeller comprising at least one blade as claimed in claim 1.

12. A turboprop engine comprising at least one propeller as claimed in claim 11.

13. An aircraft comprising at least one turboprop engine as claimed in claim 12.

14. The blade as claimed in claim 2, wherein, of the box spar and the reinforcing spars, only the reinforcing spars extend into the blade shank.

15. The blade as claimed in claim 2, wherein:
said box spar comprises at least one connection, called the central connection, which joins at least two of said plurality of soles that are successive in the chord-wise direction,
a distance between the central connection of the box spar and the hollow casing is non-zero, and
each of said reinforcing spars extends, in a thickness direction of the blade, between the central connection of the box spar and the hollow casing.

16. The blade as claimed in claim 3, wherein:
said box spar comprises at least one connection, called the central connection, which joins at least two of said plurality of soles that are successive in the chord-wise direction,
a distance between the central connection of the box spar and the hollow casing is non-zero, and
each of said reinforcing spars extends, in a thickness direction of the blade, between central connection of the box spar and the hollow casing.

17. The blade as claimed in claim 1, wherein said framework further comprises a central spar which extends longitudinally along a neutral axis of the blade.

* * * * *